US010789527B1

(12) United States Patent
Raichelgauz et al.

(10) Patent No.: US 10,789,527 B1
(45) Date of Patent: *Sep. 29, 2020

(54) METHOD FOR OBJECT DETECTION USING SHALLOW NEURAL NETWORKS

(71) Applicant: Cortica LTD., Tel Aviv (IL)

(72) Inventors: Igal Raichelgauz, Tel Aviv (IL); Roi Saida, Acco (IL)

(73) Assignee: Cortica Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/681,885

(22) Filed: Nov. 13, 2019

Related U.S. Application Data

(60) Provisional application No. 62/827,112, filed on Mar. 31, 2019, provisional application No. 62/827,121, filed on Mar. 31, 2019.

(51) Int. Cl.
  *G06N 3/04* (2006.01)
  *G06T 11/20* (2006.01)
  *G06K 9/00* (2006.01)
  *G06N 20/00* (2019.01)

(52) U.S. Cl.
  CPC ....... *G06N 3/0454* (2013.01); *G06K 9/00664* (2013.01); *G06T 11/20* (2013.01); *G06N 20/00* (2019.01); *G06T 2210/12* (2013.01)

(58) Field of Classification Search
  CPC ...... G06N 3/0454; G06N 20/00; G06N 20/10; G06N 20/20; G06K 9/0066; G06T 11/02
  USPC .......................................................... 706/15
  See application file for complete search history.

(56) References Cited

U.S. PATENT DOCUMENTS

| | | |
|---|---|---|
| 4,733,353 A | 3/1988 | Jaswa |
| 4,932,645 A | 6/1990 | Schorey et al. |
| 4,972,363 A | 11/1990 | Nguyen et al. |
| 5,078,501 A | 1/1992 | Hekker et al. |
| 5,214,746 A | 5/1993 | Fogel et al. |
| 5,307,451 A | 4/1994 | Clark |
| 5,412,564 A | 5/1995 | Ecer |

(Continued)

FOREIGN PATENT DOCUMENTS

EP    1085464 A3    1/2007

OTHER PUBLICATIONS

Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.

(Continued)

*Primary Examiner* — Shane D Woolwine
(74) *Attorney, Agent, or Firm* — Reches Patent

(57) ABSTRACT

A method that may include feeding an input image and downscaled versions of the input image to multiple branches of an object detector calculating, by the multiple branches, candidate bounding boxes; and selecting bounding boxes. The multiple branches comprise multiple shallow neural networks that are followed by multiple region units. Each branch includes a shallow neural network and a region unit. The multiple shallow neural networks are multiple instances of a single trained shallow neural network. The single trained shallow neural network is trained to detect objects having a size that is within a predefined size range and to ignore objects having a size that is outside the predefined size range.

30 Claims, 5 Drawing Sheets

(56) References Cited

U.S. PATENT DOCUMENTS

| | | |
|---|---|---|
| 5,436,653 A | 7/1995 | Ellis et al. |
| 5,568,181 A | 10/1996 | Greenwood et al. |
| 5,638,425 A | 6/1997 | Meador, I et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,657,100 B2 | 2/2010 | Gokturk et al. |
| 7,660,468 B2 | 2/2010 | Gokturk et al. |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,266,185 B2 | 9/2012 | Raichelgauz et al. |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| 8,442,321 B1 | 5/2013 | Chang et al. |
| 8,457,827 B1 | 6/2013 | Ferguson et al. |
| 8,495,489 B1 | 7/2013 | Everingham |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,311,308 B2 | 4/2016 | Sankarasubramaniam et al. |
| 9,323,754 B2 | 4/2016 | Ramanathan et al. |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,807,442 B2 | 10/2017 | Bhatia et al. |
| 9,875,445 B2 | 1/2018 | Amer et al. |
| 9,984,369 B2 | 5/2018 | Li et al. |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |

(56) References Cited

U.S. PATENT DOCUMENTS

| | | |
|---|---|---|
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0080311 A1 | 4/2006 | Potok et al. |
| 2006/0112035 A1 | 5/2006 | Cecchi et al. |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0253423 A1 | 11/2006 | McLane et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0244902 A1 | 10/2007 | Seide et al. |
| 2007/0253594 A1 | 11/2007 | Lu et al. |
| 2007/0298152 A1 | 12/2007 | Baets |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0152231 A1 | 6/2008 | Gokturk et al. |
| 2008/0159622 A1 | 7/2008 | Agnihotri et al. |
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0294278 A1 | 11/2008 | Borgeson et al. |
| 2008/0307454 A1 | 12/2008 | Ahanger et al. |
| 2008/0313140 A1 | 12/2008 | Pereira et al. |
| 2009/0024641 A1 | 1/2009 | Quigley et al. |
| 2009/0037088 A1 | 2/2009 | Taguchi |
| 2009/0043637 A1 | 2/2009 | Eder |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz et al. |
| 2009/0220138 A1 | 9/2009 | Zhang et al. |
| 2009/0245573 A1 | 10/2009 | Saptharishi et al. |
| 2009/0254572 A1 | 10/2009 | Redlich et al. |
| 2009/0282218 A1 | 11/2009 | Raichelgauz et al. |
| 2009/0297048 A1 | 12/2009 | Slotine et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0284604 A1 | 11/2010 | Chrysanthakopoulos |
| 2010/0293057 A1 | 11/2010 | Haveliwala et al. |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0035373 A1 | 2/2011 | Berg et al. |
| 2011/0055585 A1 | 3/2011 | Lee |
| 2011/0164180 A1 | 7/2011 | Lee |
| 2011/0164810 A1 | 7/2011 | Zang et al. |
| 2011/0216209 A1 | 9/2011 | Fredlund et al. |
| 2011/0218946 A1 | 9/2011 | Stern et al. |
| 2011/0276680 A1 | 11/2011 | Rimon |
| 2011/0296315 A1 | 12/2011 | Lin et al. |
| 2012/0131454 A1 | 5/2012 | Shah |
| 2012/0136853 A1 | 5/2012 | Kennedy et al. |
| 2012/0167133 A1 | 6/2012 | Carroll et al. |
| 2012/0179642 A1 | 7/2012 | Sweeney et al. |
| 2012/0185445 A1 | 7/2012 | Borden et al. |
| 2012/0207346 A1 | 8/2012 | Kohli et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0151522 A1 | 6/2013 | Aggarwal et al. |
| 2013/0159298 A1 | 6/2013 | Mason et al. |
| 2013/0226930 A1 | 8/2013 | Amgren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |

(56) References Cited

U.S. PATENT DOCUMENTS

| | | | |
|---|---|---|---|
| 2014/0125703 | A1 | 5/2014 | Roveta et al. |
| 2014/0147829 | A1 | 5/2014 | Jerauld |
| 2014/0149918 | A1 | 5/2014 | Asokan et al. |
| 2014/0152698 | A1 | 6/2014 | Kim et al. |
| 2014/0156691 | A1 | 6/2014 | Conwell |
| 2014/0169681 | A1 | 6/2014 | Drake |
| 2014/0176604 | A1 | 6/2014 | Venkitaraman et al. |
| 2014/0193077 | A1 | 7/2014 | Shiiyama et al. |
| 2014/0198986 | A1 | 7/2014 | Marchesotti |
| 2014/0201330 | A1 | 7/2014 | Lopez et al. |
| 2014/0250032 | A1 | 9/2014 | Huang et al. |
| 2014/0282655 | A1 | 9/2014 | Roberts |
| 2014/0300722 | A1 | 10/2014 | Garcia |
| 2014/0330830 | A1 | 11/2014 | Raichelgauz et al. |
| 2014/0341476 | A1 | 11/2014 | Kulick et al. |
| 2014/0363044 | A1 | 12/2014 | Williams et al. |
| 2015/0052089 | A1 | 2/2015 | Kozloski et al. |
| 2015/0100562 | A1 | 4/2015 | Kohlmeier et al. |
| 2015/0117784 | A1 | 4/2015 | Lin et al. |
| 2015/0120627 | A1 | 4/2015 | Hunzinger et al. |
| 2015/0127516 | A1 | 5/2015 | Studnitzer et al. |
| 2015/0248586 | A1 | 9/2015 | Gaidon et al. |
| 2015/0254344 | A1 | 9/2015 | Kulkarni et al. |
| 2015/0286742 | A1 | 10/2015 | Zhang et al. |
| 2015/0286872 | A1 | 10/2015 | Medioni et al. |
| 2015/0324356 | A1 | 11/2015 | Gutierrez et al. |
| 2015/0332588 | A1 | 11/2015 | Bulan et al. |
| 2016/0007083 | A1 | 1/2016 | Gurha |
| 2016/0026707 | A1 | 1/2016 | Ong et al. |
| 2016/0132194 | A1 | 5/2016 | Grue et al. |
| 2016/0221592 | A1 | 8/2016 | Puttagunta et al. |
| 2016/0275766 | A1 | 9/2016 | Venetianer et al. |
| 2016/0306798 | A1 | 10/2016 | Guo et al. |
| 2017/0017638 | A1 | 1/2017 | Satyavarta et al. |
| 2017/0154241 | A1 | 6/2017 | Shambik et al. |
| 2018/0108258 | A1 | 4/2018 | Dilger |
| 2018/0157903 | A1 | 6/2018 | Tu et al. |
| 2018/0189613 | A1* | 7/2018 | Wolf .................... G06K 9/6202 |
| 2018/0373929 | A1 | 12/2018 | Ye |
| 2019/0096135 | A1 | 3/2019 | Mutto et al. |
| 2019/0171912 | A1 | 6/2019 | Vallespi-Gonzalez et al. |
| 2019/0279046 | A1* | 9/2019 | Han .................... G06K 9/4604 |
| 2019/0304102 | A1* | 10/2019 | Chen .................... G06K 9/6272 |

OTHER PUBLICATIONS

Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.

Zhu et al., "Technology-Assisted Dietary Assesment", Proc SPIE. Mar. 20, 2008, pp. 1-15.

Akira et al., "Columbia University's Baseline Detectors for 374 LSCOM Semantic Visual Concepts", Columbia University ADVENT Technical Report #222-2006-8, Mar. 20, 2007, pp. 17.

Amparo et al., "Real Time Speaker Localization And Detection System For Camera Steering in Multiparticipant Videoconferencing Environments", IEEE International Conference on Acoustics, Speech and Signal Processing 2011,pp. 2592-2595.

Boari et al., "Adaptive Routing For Dynamic Applications In Massively Parallel Architectures", IEEE Parallel & Distributed Technology: Systems & Applications (vol. 3, Issue: 1, Spring 1995), pp. 61-74.

Boyer et al., "A Crossover Operator for Evolutionary Algorithms Based on Population Features", Journal of Artificial Intelligence Research vol. 24 (2005) pp. 1-48.

Brecheisen et al., ""Hierarchical Genre Classification for Large Music Collections"" , IEEE International Conference on Multimedia and Expo (ICME) 2006, pp. 1385-1388.

Burgsteiner et al., "Movement prediction from real-world images using a liquid state machine" ,International Conference on Industrial, Engineering and Other Applications of Applied Intelligent Systems IEA/AIE 2005: Innovations in Applied Artificial Intelligence, pp. 121-130.

Cernansky et al., "Feed-forward echo state networks", IEEE International Joint Conference on Neural Networks, 2005, vol. 3, pp. 1479-1482.

Chang et al., "VideoQ: a fully automated video retrieval system using motion sketches" , Fourth IEEE Workshop on Applications of Computer Vision. WACV'98 (Cat. No. 98EX201), Oct. 19-21, 1998, pp. 270-271.

Cho et al.,"Efficient Motion-Vector-Based Video Search Using Query By Clip", IEEE International Conference on Multimedia and Expo (ICME) (IEEE Cat. No. 04TH8763), Year: 2004, vol. 2, pp. 1027-1030.

Clement et al."Speaker diarization of heterogeneous web video files: A preliminary study", IEEE International Conference on Acoustics, Speech and Signal Processing (ICASSP),May 22-27, 2011 pp. 4432-4435.

Cococcioni et al., "Automatic diagnosis of defects of rolling element bearings based on computational intelligence techniques", Ninth International Conference on Intelligent Systems Design and Applications, Nov. 30-Dec. 2, 2009, pp. 970-975.

Emami et al., "Role of Spatiotemporal Oriented Energy Features for Robust Visual Tracking in Video Surveillance", IEEE Ninth International Conference on Advanced Video and Signal-Based Surveillance Sep. 18-21, 2012, pp. 349-354.

Fathy et al., "A parallel design and implementation for backpropagation neural network using MIMD architecture", 8th Mediterranean Electrotechnical Conference on Industrial Applications in Power Systems, Computer Science and Telecommunications (MELECON 96) ,May 16, 1996,1472-1476.

Foote et al.,"Content-based retrieval of music and audio", Multimedia Storage and Archiving Systems II, Published in SPIE Proceedings vol. 3229, Oct. 6, 1997, p. 1.

Freisleben et al., "Recognition of fractal images using a neural network",New Trends in Neural Computation, International Workshop on Artificial Neural Networks, IWANN '93 Sitges, Spain, Jun. 9-11, 1993: , pp. 632-637.

Ivan Garcia, "Solving The Weighted Region Least Cost Path Problem Using Transputers", Naval Postgraduate School Monterey, California ,1989 pp. 73.

Gomes et al., "Audio Watermarking and Fingerprinting: For Which Applications?", Journal of New Music Research 32(1) Mar. 2003 p. 1.

Gong et al., "A Knowledge-Based Mediator For Dynamic Integration Of Heterogeneous Multimedia Information Sources", International Symposium on Intelligent Multimedia, Video and Speech Processing, Oct. 20-22, 2004, pp. 467-470.

Guo et al., "AdOn: An Intelligent Overlay Video Advertising System", https://doi.org/10.1145/1571941.1572049, Jul. 2009, pp. 628-629.

Howlett et al., "A Multi-Computer Neural Network Architecture in a Virtual Sensor System Application", International Journal of Knowledge-Based and Intelligent Engineering Systems, vol. 4, Published—Apr. 2000 pp. 86-93.

Hua et al., "Robust Video Signature Based on Ordinal Measure", International Conference on Image Processing ICIP '04. 2004, Oct. 24-27, 2004, pp. 5.

Iwamoto et al, "Image Signature Robust To Caption Superimposition For Video Sequence Identification", 2006 International Conference on Image Processing ,IEEE, Atlanta, GA, Oct. 8-11, 2006, pp. 3185-3188.

Herbert Jaeger, "The" echo state" approach to analysing and training recurrent neural networks", Bonn, Germany: German National Research Center for Information Technology GMD Technical Report, 148 ,2001, pp. 43.

Jianping Fan et al., "Concept-Oriented Indexing Of Video Databases: Toward Semantic Sensitive Retrieval and Browsing", IEEE Transactions on Image Processing, vol. 13, No. 7, Jul. 2004, p. 1.

John L. Johnson., Pulse-coupled neural nets: translation, rotation, scale, distortion, and intensity signal invariance for images, vol. 33, No. 26, Applied Optics, Sep. 10, 1994, pp. 6239-6253.

(56) References Cited

OTHER PUBLICATIONS

Odinaev et al., "Cliques in Neural Ensembles as Perception Carriers", 2006 International Joint Conference on Neural Networks Sheraton Vancouver Wail Centre Hotel, Vancouver, BC, Canada Jul. 16-21, 2006, pp. 285-292.

Kabary et al., "SportSense: Using Motion Queries to Find Scenes in Sports Videos", DOI: 10.1145/2505515.2508211, Oct. 2013, pp. 2489-2491.

Keiji Yanai., "Generic Image Classification Using Visual Knowledge on the Web", DOI: 10.1145/957013.957047, Jan. 2003, pp. 167-176.

Lau et al., "Semantic Web Service Adaptation Model for a Pervasive Learning Scenario", Proceedings of the 2008 IEEE Conference on Innovative Technologies in Intelligent Systems and Industrial Applications Multimedia University, Cyberjaya, Malaysia. Jul. 12-13, 2008, pp. 98-103.

Li et al., "Matching Commercial Clips from TV Streams Using a Unique, Robust and Compact Signature", DOI: 10.1109/DICTA. 2005.52, Jan. 2006, pp. 7.

Lin et al., "Generating Robust Digital Signature for Image/Video Authentication", Multimedia and Security Workshop at ACM Multimedia '98. Bristol. U.K., Sep. 1998, pp. 49-54.

Löytynoja et al., "Audio Encryption Using Fragile Watermarking", DOI: 10.1109/ICICS.2005.1689175, Jul. 2015, pp. 881-885.

Richard F. Lyon., "Computational Models of Neural Auditory Processing", DOI: 10.1109/ICASSP.1984.1172756, ICASSP '84. IEEE International Conference on Acoustics, Speech, and Signal Processing, Jan. 29, 2003, pp. 5.

Maass et al., "Computational Models for Generic Cortical Microcircuits", DOI: 10.1201/9780203494462.ch18, Jun. 10, 2003, pp. 1-26.

Mandhaoui et al., "Emotional speech characterization based on multi-features fusion for face-to-face interaction", 2009 International conference on signals, circuits and systems ,DOI: 10.1109/ICSCS.2009.5412691, Dec. 2009, pp. 1-6.

May et al., "The Transputer", Neural Computers. Springer Study Edition, vol. 41. Springer, Berlin, Heidelberg, DOI: 10.1007/978-3-642-83740-1_48, Jan. 1989 pp. 477-486.

McNamara et al., "Diversity Decay in Opportunistic Content Sharing Systems", DOI: 10.1109/WoWMoM.2011.5986211 2011 IEEE International Symposium on a World of Wireless, Mobile and Multimedia Networks Aug. 15, 2011, pp. 1-3.

Mei et al., "Contextual in-image Advertising",MM'OS, Oct. 26-31, 2008. Vancouver, British Columbia, Canada. Copyright 2008 ACM 978-1-60558-303—Jul. 8, 2010, DOI: 10.1145/1459359.1459418 • Source: DBLP, Jan. 2008, pp. 439-448.

Mei et al., "VideoSense—Towards Effective Online Video Advertising", MM'07, Sep. 23-28, 2007, Augsburg, Bavaria, Germany. Copyright 2007 ACM 978-1-59593-701—Aug. 7, 0009 . . . $5.00, Jan. 2007, pp. 1075-1084.

Mladenovic et al., "Electronic Tour Guide for Android Mobile Platform with Multimedia Travel Book" 20th Telecommunications forum TELFOR 2012, DOI: 10.1109/TELFOR.2012.6419494, Nov. 20-22, 2012, pp. 1460-1463.

Morad et al., "Performance, Power Efficiency and Scalability of Asymmetric Cluster Chip Multiprocessors", IEEE Computer Architecture Letters, vol. 5, 2006, DOI 10.1109/L-CA.2006.6, Jul. 5, 2006, pp. 4.

Nagy et al., "A Transputer Based, Flexible, Real-Time Control System for Robotic Manipulators", UKACC International Conference on Control '96, Conference Publication No. 427 © IEE 1996, Sep. 2-5, 1996, pp. 84-89.

Nam et al., "Audio-Visual Content-Based Violent Scene Characterization", Proceedings 1998 International Conference on Image Processing. ICIP98 (Cat. No. 98CB36269), DOI: 10.1109/ICIP. 1998.723496, pp. 353-357.

Natschläger et al., "The "Liquid Computer": A Novel Strategy for Real-Time Computing on Time Series", Jan. 2002, pp. 1-7.

Nouza et al., "Large-Scale Processing, Indexing and Search System for Czech Audio-Visual Cultural Heritage Archives", DOI: 10.1109/MMSP.2012.6343465, Sep. 2012, pp. 337-342.

Odinaev., "Cliques to Neural Ensembles as Perception Carriers", 2006 International Joint Conference on Neural Networks Sheraton Vancouver Wail Centre Hotel, Vancouver, BC, Canada, DOI: 10.1109/IJCNN.2006.246693, Jul. 16-21, 2006, pp. 285-292.

Park et al., "Compact Video Signatures for Near-Duplicate Detection on Mobile Devices", DOI: 10.1109/ISCE.2014.6884293, Jun. 2014, pp. 1-2.

Maria Paula Queluz., "Content-based integrity protection of digital images", San Jose. California •Jan. 1999 SPIE vol. 3657 •0277-786X/99/$10.00, DOI: 10.1117/12.344706, Apr. 1999, pp. 85-93.

Raichelgauz et al., "Co-evoletiooary Learning in Liquid Architectures", DOI: 10.1007/11494669_30, Jun. 2005, pp. 241-248.

Ribert et al., "An Incremental Hierarchical Clustering", Vision Interface '99, Trois-Rivieres, Canada, May 19-21, pp. 586-591.

Boari et al, "Adaptive Routing for Dynamic Applications in Massively Parallel Architectures", 1995 IEEE, Spring 1995, pp. 1-14.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Chinchor, Nancy A. et al.; Multimedia Analysis + Visual Analytics = Multimedia Analytics; IEEE Computer Society; 2010; pp. 52-60. (Year: 2010).

Fathy et al, "A Parallel Design and Implementation For Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Freisleben et al, "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Guo et al, AdOn: An Intelligent Overlay Video Advertising System (Year: 2009).

Hogue, "Tree Pattern Inference and Matching for Wrapper Induction on the World Wide Web", Master's Thesis, Massachusetts Institute of Technology, Jun. 2004, pp. 1-106.

Howlett et al, "A Multi-Computer Neural Network Architecture in a Virtual Sensor System Application", International journal of knowledge-based intelligent engineering systems, 4 (2). pp. 86-93, 133N 1327-2314.

Hua et al., "Robust Video Signature Based on Ordinal Measure", Image Processing, 2004, 2004 International Conference on Image Processing (ICIP), vol. 1, IEEE, pp. 685-688, 2004.

Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.

Lau et al., "Semantic Web Service Adaptation Model for a Pervasive Learning Scenario", 2008 IEEE Conference on Innovative Technologies in Intelligent Systems and Industrial Applications, 2008, pp. 98-103.

Li et al ("Matching Commercial Clips from TV Streams Using a Unique, Robust and Compact Signature" 2005) (Year: 2005).

Lin et al., "Generating robust digital signature for image/video authentication", Multimedia and Security Workshop at ACM Multimedia '98, Bristol, U.K., Sep. 1998, pp. 245-251.

Lyon, "Computational Models of Neural Auditory Processing", IEEE International Conference on Acoustics, Speech, and Signal Processing, ICASSP '84, Date of Conference: Mar. 1984, vol. 9, pp. 41-44.

May et al, "The Transputer", Springer-Verlag Berlin Heidelberg 1989, vol. 41.

McNamara et al., "Diversity Decay in opportunistic Content Sharing Systems", 2011 IEEE International Symposium on a World of Wireless, Mobile and Multimedia Networks, pp. 1-3.

Morad et al., "Performance, Power Efficiency and Scalability of Asymmetric Cluster Chip Multiprocessors", Computer Architecture Letters, vol. 4, Jul. 4, 2005, pp. 1-4, XP002466254.

(56) References Cited

OTHER PUBLICATIONS

Nagy et al, "A Transputer, Based, Flexible, Real-Time Control System for Robotic Manipulators", UKACC International Conference on Control '96, Sep. 2-5, 1996, Conference Publication No. 427, IEE 1996.

Natschlager et al., "The "Liquid Computer": A novel strategy for real-time computing on time series", Special Issue on Foundations of Information Processing of telematik, vol. 8, No. 1, 2002, pp. 39-43, XP002466253.

Odinaev et al, "Cliques in Neural Ensembles as Perception Carriers", Technion—Institute of Technology, 2006 International Joint Conference on neural Networks, Canada, 2006, pp. 285-292.

Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.

Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).

Queluz, "Content-Based Integrity Protection of Digital Images", SPIE Conf. on Security and Watermarking of Multimedia Contents, San Jose, Jan. 1999, pp. 85-93.

Santos et al., "SCORM-MPEG: an Ontology of Interoperable Metadata for multimediaand E-Learning", 23rd International Conference on Software, Telecommunications and Computer Networks (SoftCom), 2015, pp. 224-228.

Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.

Schneider et al, "A Robust Content based Digital Signature for Image Authentication", Proc. ICIP 1996, Lausane, Switzerland, Oct. 1996, pp. 227-230.

Stolberg et al ("HIBRID-SOC: A Multi-Core SOC Architecture for Multimedia Signal Processing" 2003).

Stolberg et al, "HIBRID-SOC: A Mul Ti-Core SOC Architecture for Mul Timedia Signal Processing", 2003 IEEE, pp. 189-194.

Theodoropoulos et al, "Simulating Asynchronous Architectures on Transputer Networks", Proceedings of the Fourth Euromicro Workshop On Parallel and Distributed Processing, 1996. PDP '96, pp. 274-281.

Vallet et al ("Personalized Content Retrieval in Context Using Ontological Knowledge" Mar. 2007) (Year: 2007).

Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.

Whitby-Strevens, "The transputer", 1985 IEEE, pp. 292-300.

Wilk et al., "The Potential of Social-Aware Multimedia Prefetching on Mobile Devices", International Conference and Workshops on networked Systems (NetSys), 2015, pp. 1-5.

Lin et al., "Summarization of Large Scale Social Network Activity", DOI: 10.1109/ICASSP.2009.4960375, Apr. 2009, pp. 3481-3484.

Santos et al., "SCORM-MPEG: an ontology of interoperable metadata for Multimedia and e-Learning", DOI: 10.1109/SOFTCOM.2015. 7314122, Nov. 2, 2015, pp. 5.

Scheper et al., "Nonlinear dynamics in neural computation", ESANN, 14th European Symposium on Artificial Neural Networks, Jan. 2006, pp. 491-502.

Schneider et al., "A Robust Content Based Digital Signature for Image Authentication", 3rd IEEE International Conference on Image Processing, Sep. 19, 2006, pp. 227-230.

Semizarov et al.,"Specificity of short interfering RNA determined through gene expression signatures", PNAS vol. 100 (11), May 27, 2003, pp. 6347-6352.

Sheng Hua et al., "Robust video signature based on ordinal measure", ICIP '04. 2004 International Conference on Image Processing, Oct. 2004, pp. 685-688.

Stolberg et al., "HiBRID-SoC: A multi-core SoC architecture for multimedia signal processing. VLSI Signal Processing", Journal of VLSI Signal Processing vol. 41(1), Aug. 2005, pp. 9-20.

Theodoropoulos et al., "Simulating asynchronous architectures on transputer networks", 4th Euromicro Workshop on Parallel and Distributed Processing, Braga, Portugal, 1996, pp. 274-281.

Vailaya et al., "Content-Based Hierarchical Classification of Vacation Images", International Conference on Multimedia Computing and Systems, vol. 1, DOI-10.1109/MMCS.1999.779255, Jul. 1999, pp. 518-523.

Verstraeten et al., "Isolated word recognition with the Liquid State Machine: A case study", Information Processing Letters, vol. 95(6), Sep. 2005, pp. 521-528.

Vallet et al.,"Personalized Content Retrieval in Context Using Ontological Knowledge", in IEEE Transactions on Circuits and Systems for Video Technology, vol. 17, No. 3, Mar. 2007, pp. 336-346.

Wang et al., "Classifying objectionable websites based on image content" Interactive Distributed Multimedia Systems and Telecommunication Services, vol. 1483, 1998, pp. 113-124.

Wang et al., "A Signature for Content-Based Image Retrieval Using a Geometrical Transform", 6th ACM International Conference on Multimedia, Multimedia 1998, pp. 229-234.

Ware et al., "Locating and identifying components in a robot's workspace using a hybrid computer architecture", 10th International Symposium on Intelligent Control, 1995, pp. 139-144.

Li et al. "Exploring Visual and Motion Saliency for Automatic Video Object Extraction", in IEEE Transactions on Image Processing, vol. 22, No. 7, Jul. 2013, pp. 2600-2610.

Colin Whitby-Strevens, "The transputer", 12th annual international symposium on Computer architecture (ISCA), IEEE Computer Society Press, Jun. 1985, pp. 292-300.

Wilk et al., "The potential of social-aware multimedia prefetching on mobile devices", International Conference and Workshops on Networked Systems (NetSys 2015) Mar. 2015, p. 1.

Andrew William Hogue, "Tree pattern inference and matching for wrapper induction on the World Wide Web", May 13, 2014, pp. 106.

Liu et al. "Instant Mobile Video Search With Layered Audio-Video Indexing and Progressive Transmission", IEEE Transactions on Multimedia 16(Dec. 8, 2014, pp. 2242-2255.

Raichelgauz et al., "Natural Signal Classification by Neural Cliques and Phase-Locked Attractors", International Conference of the IEEE Engineering in Medicine and Biology Society, 2006, pp. 6693-6697.

Lin et al., "Robust digital signature for multimedia authentication", IEEE Circuits and Systems Magazine, vol. 3, No. 4, 2003, pp. 23-26.

Zang et al., "A New Multimedia Message Customizing Framework for mobile Devices", IEEE International Conference on Multimedia and Expo, 2007, pp. 1043-1046.

Zhou et al., "Ensembling neural networks: Many could be better than all", Artificial Intelligence, vol. 137, 2002, pp. 239-263.

Zhou et al., "Medical diagnosis with C4.5 rule preceded by artificial neural network ensemble", IEEE Transactions on Information Technology in Biomedicine, vol. 7, No. 1, Mar. 2003, pp. 37-42.

Zhu et al., "Technology-Assisted Dietary Assessment", SPIE. 6814. 681411, 2008, p. 1.

Zou et al., "A content-based image authentication system with lossless data hiding", International Conference on Multimedia and Expo. ICME, 2003, pp. II(213)-II(216).

\* cited by examiner

METHOD FOR OBJECT DETECTION USING SHALLOW NEURAL NETWORKS

CROSS REFERENCE

This application claims priority from U.S. provisional patent 62/827,121 filing date Mar. 31 2019.

BACKGROUND

Object detection is required in various systems and applications.

There is a growing need to provide a method and a system that may be able to provide highly accurate object detection at a low cost.

SUMMARY

There may be provided a method for object detection, the method may include receiving an input image by an input of an object detector; wherein the object detector may include multiple branches; generating at least one downscaled version of the input image; feeding the input image to a first branch of the multiple branches; feeding each one of the at least one downscale version of the input image to a unique branch of the multiple branches, one downscale version of the image per branch; calculating, by the multiple branches, candidate bounding boxes that may be indicative of candidate objects that appear in the input image and each one of the at least one downscaled version of the input image; selecting bounding boxes out of the candidate bounding boxes, by a selection unit that followed the multiple branches; wherein the multiple branches may include multiple shallow neural networks that may be followed by multiple region units; wherein each branch may include a shallow neural network and a region unit; wherein the multiple shallow neural networks may be multiple instances of a single trained shallow neural network; and wherein the single trained shallow neural network may be trained to detect objects having a size that may be within a predefined size range and to ignore objects having a size that may be outside the predefined size range.

The method may include generating the multiple downscaled applying a same downscaling ratio between (a) the input image and a first downscaled version of the image and between (b) the first downscale version of the input image to a second downscale version of the input image.

There may be provided a non-transitory computer readable medium for detecting an object by an object detector, wherein the non-transitory computer readable medium may store instructions for: receiving an input image by an input of the object detector; wherein the object detector may include multiple branches; generating at least one downscaled version of the input image; feeding the input image to a first branch of the multiple branches; feeding each one of the at least one downscale version of the input image to a unique branch of the multiple branches, one downscale version of the image per branch; calculating, by the multiple branches, candidate bounding boxes that may be indicative of candidate objects that appear in the input image and each one of the at least one downscaled version of the input image; selecting bounding boxes out of the candidate bounding boxes, by a selection unit that follows the multiple branches; wherein the multiple branches may include multiple shallow neural networks that may be followed by multiple region units; wherein each branch may include a shallow neural network and a region unit; wherein the multiple shallow neural networks may be multiple instances of a single trained shallow neural network; and wherein the single trained shallow neural network may be trained to detect objects having a size that may be within a predefined size range and to ignore objects having a size that may be outside the predefined size range.

The non-transitory computer readable medium that may store instructions for generating the multiple downscaled applying a same downscaling ratio between (a) the input image and a first downscaled version of the image and between (b) the first downscale version of the input image to a second downscale version of the input image.

There may be provided an object detection system that may include an input, a downscaling unit, multiple branches, and a selection unit; wherein the input may be configured to receive an input image; wherein the downscaling unit may be configured to generate at least one downscaled version of the input image; wherein the multiple branches may be configured to receive the input image and the at least one downscaled version of the input image, one image per branch; wherein the multiple branches may be configured to calculate candidate bounding boxes that may be indicative of candidate objects that appear in the input image and each one of the at least one downscaled version of the input image; wherein the selection unit may be configured to select bounding boxes out of the candidate bounding boxes; wherein the multiple branches may include multiple shallow neural networks that may be followed by multiple region units; wherein each branch may include a shallow neural network and a region unit; wherein the multiple shallow neural networks may be multiple instances of a single trained shallow neural network; and wherein the single trained shallow neural network may be trained to detect objects having a size that may be within a predefined size range and to ignore objects having a size that may be outside the predefined size range.

The downscaling unit may be configured to generate the multiple downscaled applying a same downscaling ratio between (a) the input image and a first downscaled version of the image and between (b) the first downscale version of the input image to a second downscale version of the input image.

The predefined size range may range between (a) about ten by ten pixels, till (b) about one hundred by one hundred pixels.

The predefined size range may range between (a) about sixteen by sixteen pixels, till (b) about one hundred and twenty pixels by one hundred and twenty pixels.

The predefined size range may range between (a) about eighty by eighty pixels, till (b) about one hundred by one hundred pixels.

The multiple branches may be three branches and wherein there may be two downscaled versions of the input image.

The at least one downscaled version of the image may be multiple downscaled versions of the input image.

The first downscale version of the input image may have a width that may be one half of a width of the input image and a length that may be one half of a length of a length of an input image.

The each shallow neural network may have up to four layers.

The each shallow neural network may have up to five layers.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
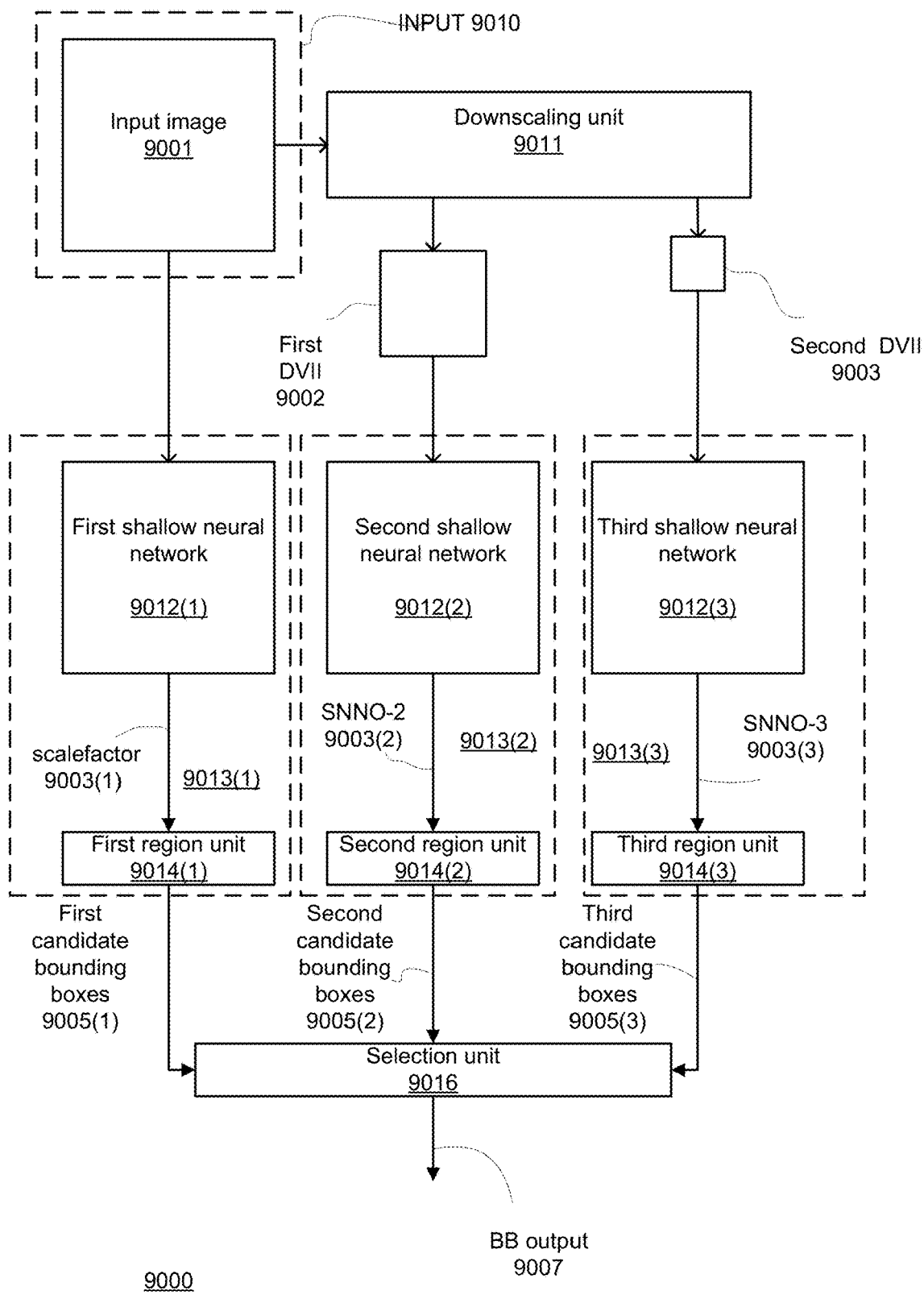
FIG. 1 illustrates an example of an object detection system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

There may be provided a low power object detection system (detector), non-transitory computer readable medium and method. The object detection system, non-transitory computer readable medium and method also provide a high level semantic multi scale feature maps, without impairing the speed of the detector.

Each additional convolution layer increases the detector physical receptive field, therefore, enlargement of the maximum object size that is managed by the detector result in increasing the required number of convolution layers.

Since each layer of the convolutional network has a fixed receptive field, it is not optimal to detect objects of different scales utilizing only features generated by the last convolutional layer.

Shallow feature maps have small receptive fields that are used to detect small objects, and deep feature maps have large receptive fields that are used to detect large objects.

Nevertheless, shallow features might have less semantic information, which may impair the detection of small objects.

The above theorem was very popular at the first object detectors that have been released until 2016. In contrast, at the last few years, we are witness to a new trend of very deep networks integrated into state of the art object detectors. hence state of the art object detectors detect small objects using feature maps extracted from enormous receptive fields.

That implementation forces ineffective forward propagation of small object features from earlier network's stages to deeper network's stages.

Thus while managing larger objects required deeper network, the ineffective detection of small objects increase the number of channels along the network or complicating the memory data transition between layers.

Interesting theorem explaining the motivation of using feature maps that have large receptive fields for small objects suggests that in order to detect a small object we take advantage of the context information surrounding it. For example, we can easily distinguish between small car driving on the roadway and boat sailing on the sea employing the surrounding background information which is notably more differently than the internal context information of that two small objects.

However, real-time automotive application can't take advantage of deeper/wider/Complex networks because those networks are not applicable due to power consuming limitation requirements.

FIG. 1 illustrates an object detection system 9000 that includes an input 9010 (illustrated as receiving input image 9001), a downscaling unit 9011, multiple branches (such as three branches 9013(1), 9013(2) and 9013(3)), and a selection unit 9016 such as a non-maximal suppression unit.

Input 910 may be configured to receive an input image by an input of an object detector.

Downscaling unit 9011 may be configured to generate at least one downscaled version of the input image.

The multiple branches 9013(1), 9013(2) and 9013(3) may be configured to receive the input image and the at least one downscaled version of the input image, one image per branch.

Input image 9001 is fed to first branch 9013(1) that is configured to calculate first candidate bounding boxes that may be indicative of candidate objects that appear in the input image.

First downscaled version of the input image (DVII) 9002 is fed to second branch 9013(2) that is configured to calculate second candidate bounding boxes that may be indicative of candidate objects that appear in first DVII 9002.

Second DVII 9003 is fed to third branch 9013(3) that is configured to calculate third candidate bounding boxes that may be indicative of candidate objects that appear in second DVII 9003.

The multiple branches may include multiple shallow neural networks that may be followed by multiple region units.

In first branch 9013(1), a first shallow neural network 9012(1) is followed by first region unit 9014(1).

The first shallow neural network 9012(1) outputs a first shallow neural network output (SNNO-1) 9003(1) that may be a tensor with multiple features per segment of the input image. The first region unit 9014(1) is configured to receive SNNO-1 9003(1) and calculate and output first candidate bounding boxes 9005(1).

The second shallow neural network 9012(2) outputs a second SNNO (SNNO-2) 9003(2) that may be a tensor with multiple features per segment of the first DVII 9002. The second region unit 9014(2) is configured to receive SNNO-2 9003(2) and calculate and output second candidate bounding boxes 9005(2).

The third shallow neural network 9012(3) outputs a third SNNO (SNNO-3) 9003(3) that may be a tensor with multiple features per segment of the second DVII 9003. The third region unit 9014(3) is configured to receive SNNO-3 9003(3) and calculate and output third candidate bounding boxes 9005(3).

The multiple shallow neural networks 9012(1), 9012(2) and 9012(3) may be multiple instances of a single trained shallow neural network.

The single trained shallow neural network may be trained to detect objects having a size that may be within a predefined size range and to ignore objects having a size that may be outside the predefined size range.

The selection unit 9016 may be configured to select bounding boxes (denoted BB output 9007) out of the first, second and third candidate bounding boxes.

The selected bounding boxes may be further processed to detect the objects. Additionally or alternatively—the bounding boxes may provide the output of the object detection system.

The branch that receives the input image is configured to detect objects that have a size that is within the predefined size range.

The predefined size range may span along certain fractions of the input image (for example—between less than a percent to less than ten percent of the input image—although other fractions may be selected).

The predefined size range may be tailored to the expected size of images within a certain distance range from the sensor.

The predefined size range may span along certain numbers of pixels—for example between (a) about 10, 20, 30, 40, 50, 60, 70, 80, and 90 pixels by about 10, 20, 30, 40, 50, 60, 70, 80, and 90, and (b) about 100, 110, 120, 130, 140, 150, 160 pixels by about 100, 110, 120, 130, 140, 150, 160 pixels.

Each branch that receives a downscaled version of the input image (assuming of a certain downscaling factor) may detect objects have a size (within the downscaled version of the input image) that is within the predefined size range—and thus may detect images that appear in the input image having a size that is within a size range that equals the predefined range multiplied by the downscaling factor.

Assuming, for example that the input image is of 576×768 pixels (each pixel is represented by three colors), the first DVII is 288×384 pixels (each pixel is represented by three colors), and the second DVII is 144×192 pixels (each pixel is represented by three colors), that SNNO-1 has 85 features per each segment out 36×48 segments, that SNNO-2 has 85 features per each segment out 18×24 segments, that SNNO-3 has 85 features per each segment out 9×12 segments.

The assumption above as well as the example below are merely non-limiting examples of various values. Other values may be provided.

Under these assumptions, each shallow neural network may detect an object having a size between 20×20 to 100×100 pixels and physical receptive field around 200×200 pixels. This assumes automotive objects can be effectively represented using bounding box dimension below 100×100.

In contrast to a single model trained end to end, the following architecture contains several identical shallow neural networks.

The first branch detects small object (as appearing in the input image), the second branch detects medium objects (as appearing in the input image), and the third branch detects large objects (as appearing in the input image)—all may be within a limited predefined size range.

The number of branches, scales, and the downscale factor may differ from those illustrated in FIG. 1. For example—there may be two or more than three branches, the downscaling factor may differ from 2×2, downscaling factors between different images may differ from each other, and the like.

Figure 2:
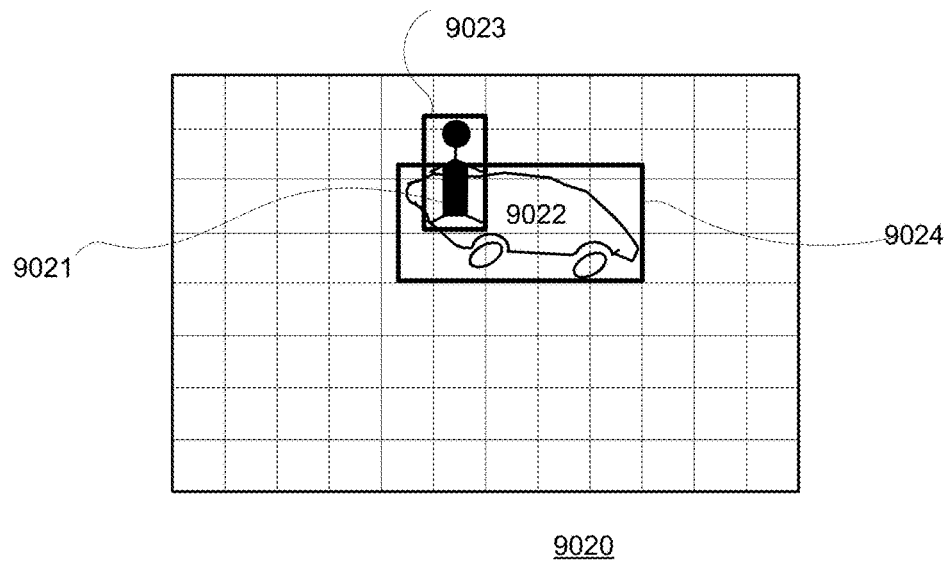
FIG. 2 illustrates an example of an image, two objects, two bounding boxes and a bounding box output.

FIG. 2 illustrates an example of an image 9020, two objects-pedestrian 9021 and car 9022, two bounding boxes 9023 (bounding pedestrian 9021) and 9024 (bounding car 9022) and a bounding box output 9025.

The bounding box output 9025 may include coordinates (x,y,h,w) of the bounding boxes, objectiveness and class. The coordinate indicate the location (x,y) as well as the height and width of the bounding boxes. Objectiveness provides a confidence level that an object exists. Class—class of object—for example cat, dog, vehicle, person . . . ). The (x,y) coordinates may represent the center of the bounding box.

The object detection may be compliant to any flavor of YOLO—but other object detection schemes may be applied.

Figure 3:
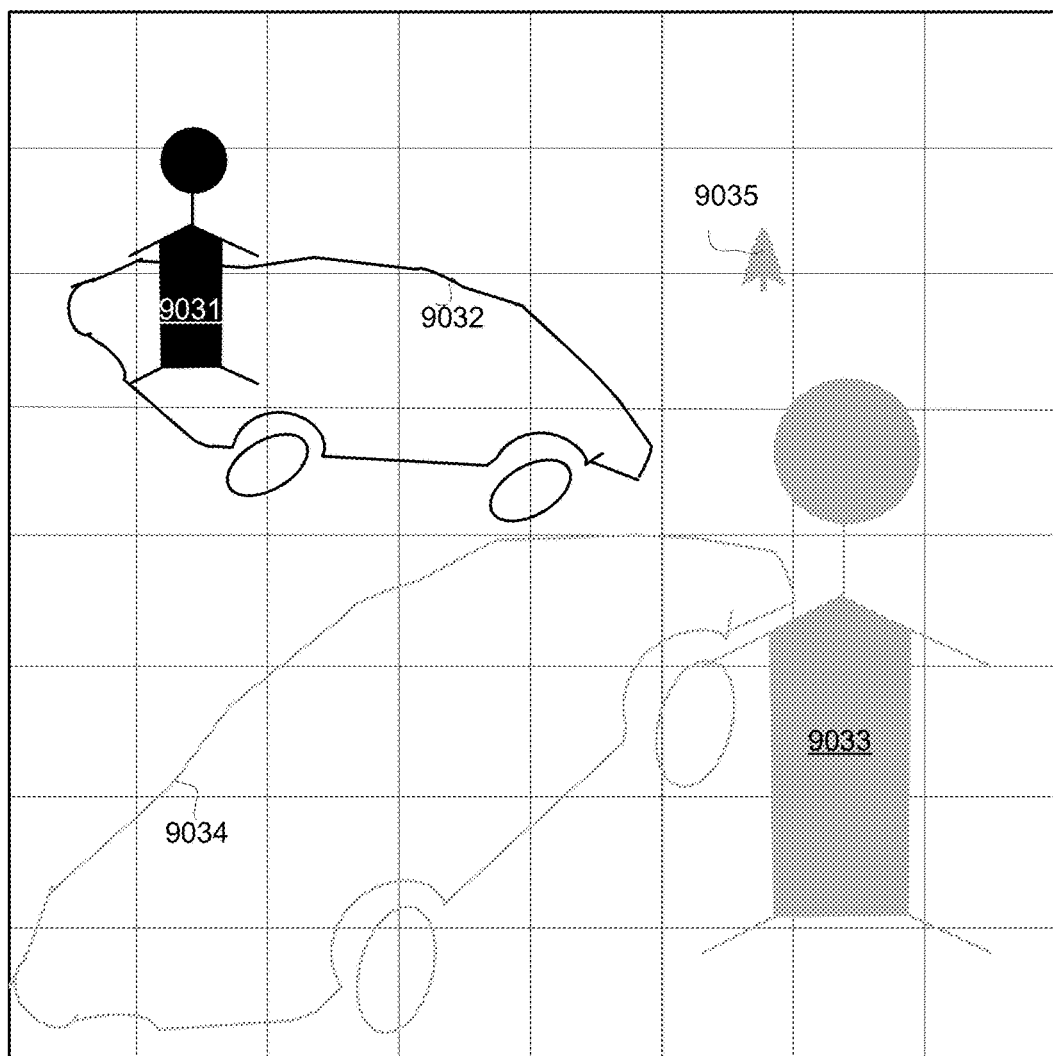
FIG. 3 illustrates an image and various objects.

FIG. 3 illustrates an image 9030 and various objects 9031, 9032, 9033 and 9034.

Objects 9033 and 9034 are outside the predefined size range and should be ignored of. The single trained neural network is trained to detect objects 9031 and 9032 (within the predefined size range) and ignore objects 9033 and 9034.

Figure 4:
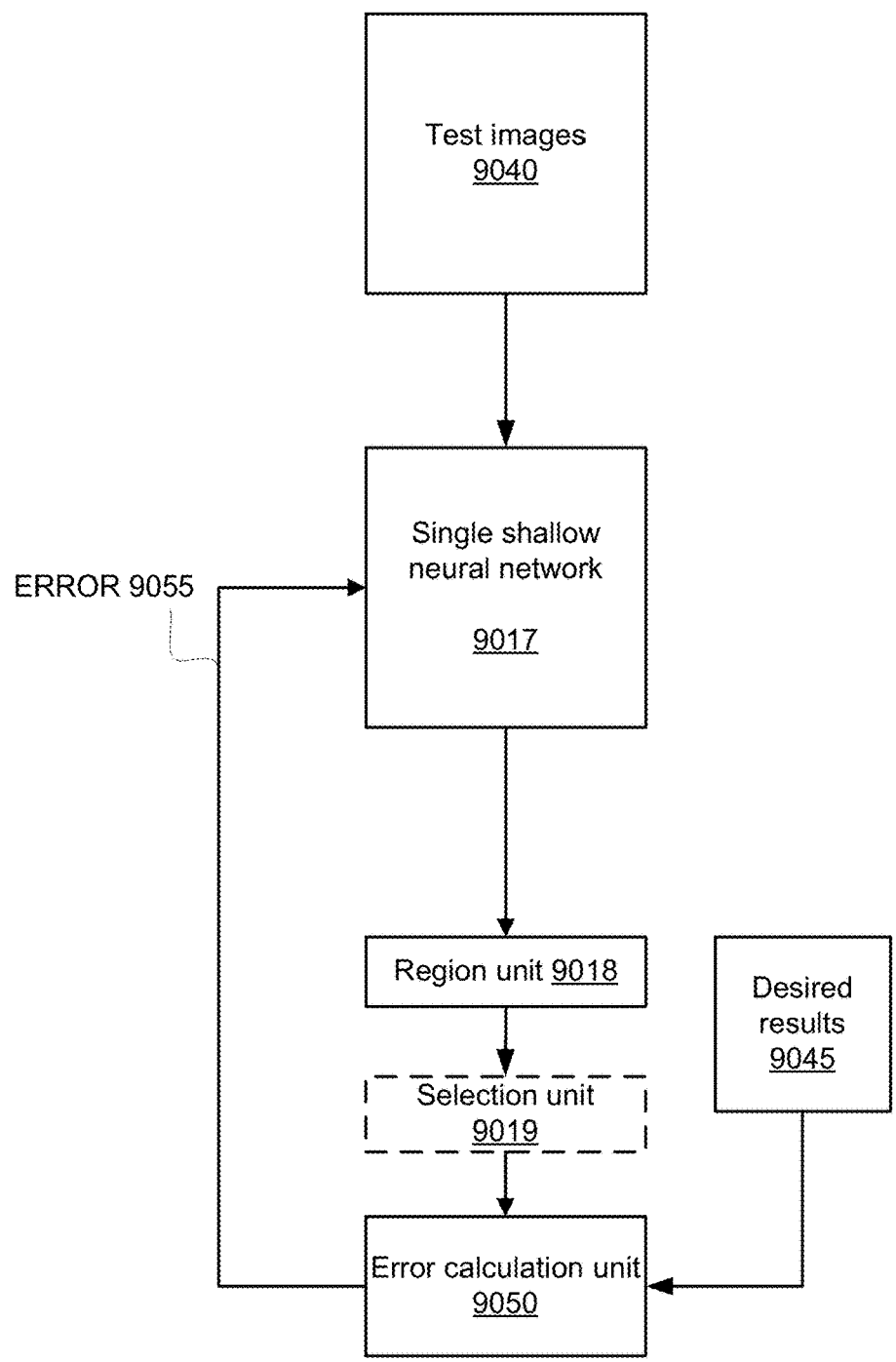
FIG. 4 illustrates an example of a training process.

FIG. 4 illustrates an example of a training process.

Test images 9040 are fed to single shallow neural network 9017 that outputs, for each test image, a single shallow neural network output that may be a tensor with multiple features per segment of the test image. The region unit 9018 is configured to receive the output from single shallow neural network 9017 and calculate and output candidate bounding boxes per test image. Actual results such as the output candidate bounding boxes per test image or an output of a selecting unit 9019 (that follows region unit 9018) may be fed to error calculation unit 9050.

Error calculation unit 9050 also receives desired results 9045—objects of a size of the predefined range that should be detected by the single shallow neural network 9017.

Error calculation unit 9050 calculates an error 9055 between the the actual results and the desired results- and the error is fed to the single shallow neural network 9017 during the training process.

Figure 5:
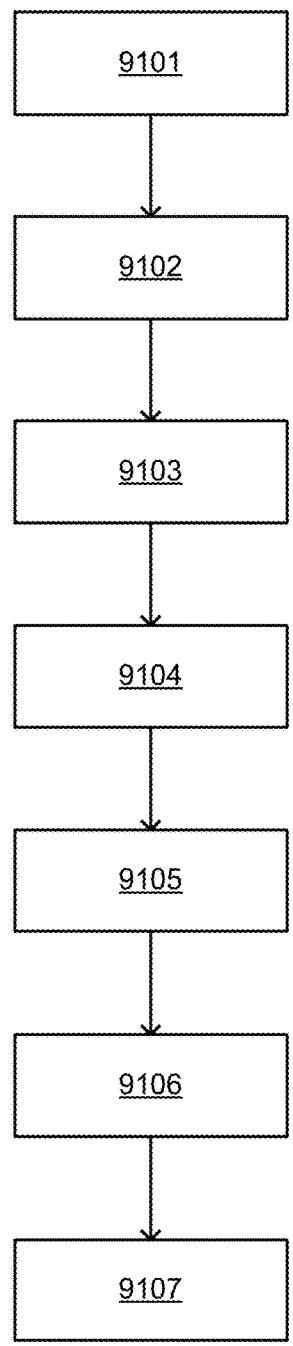
FIG. 5 illustrates an example of a method for object detection.

FIG. 5 illustrates an example of a method 9100 for object detection.

Method 9100 may include the following steps:

Step 9101 of receiving an input image by an input of an object detector. The object detector may include multiple branches. The multiple branches may include multiple shallow neural networks that may be followed by multiple region units. Each branch may include a shallow neural network and a region unit. The multiple shallow neural networks may be multiple instances of a single trained shallow neural network. The single trained shallow neural network may be trained to detect objects having a size that may be within a predefined size range and to ignore objects having a size that may be outside the predefined size range.

Step 9102 of generating at least one downscaled version of the input image.

Step 9103 of feeding the input image to a first branch of the multiple branches.

Step 9104 of feeding each one of the at least one downscale version of the input image to a unique branch of the multiple branches, one downscale version of the image per branch.

Step 9105 of calculating, by the multiple branches, candidate bounding boxes that may be indicative of candidate objects that appear in the input image and each one of the at least one downscaled version of the input image.

Step 9106 of selecting bounding boxes out of the candidate bounding boxes, by a selection unit that followed the multiple branches.

Step 9107 of outputting the bonding boxes and/or further processing the bounding boxes.

Method 9100 may include training the single trained shallow neural network.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof

What is claimed is:

1. A method for object detection, the method comprises:
receiving an input image by an input of an object detector; wherein the object detector comprises multiple branches
generating at least one downscaled version of the input image;
feeding the input image to a first branch of the multiple branches;
feeding each one of the at least one downscale version of the input image to a unique branch of the multiple branches, one downscale version of the image per branch;
calculating, by the multiple branches, candidate bounding boxes that are indicative of candidate objects that appear in the input image and each one of the at least one downscaled version of the input image;
selecting bounding boxes out of the candidate bounding boxes, by a selection unit that followed the multiple branches;
wherein the multiple branches comprise multiple shallow neural networks that are followed by multiple region units; wherein each branch comprises a shallow neural network and a region unit;
wherein the multiple shallow neural networks are multiple instances of a single trained shallow neural network; and
wherein the single trained shallow neural network is trained to detect objects having a size that is within a predefined size range and to ignore objects having a size that is outside the predefined size range.

2. The method according to claim 1 wherein the predefined size range ranges between (a) ten by ten pixels, till (b) one hundred by one hundred pixels.

3. The method according to claim 1 wherein the predefined size range ranges between (a) sixteen by sixteen pixels, till (b) one hundred and twenty pixels by one hundred and twenty pixels.

4. The method according to claim 1 wherein the predefined size range ranges between (a) eighty by eighty pixels, till (b) one hundred by one hundred pixels.

5. The method according to claim 1 wherein the multiple branches are three branches and wherein there are two downscaled versions of the input image.

6. The method according to claim 1 wherein the generating of the at least one downscaled version of the input image comprises generating multiple downscaled versions of the input image.

7. The method according to claim 6 comprising generating the multiple downscaled applying a same downscaling ratio between (a) the input image and a first downscaled version of the image and between (b) the first downscale version of the input image to a second downscale version of the input image.

8. The method according to claim 6 wherein a first downscale version of the input image has a width that is one half of a width of the input image and a length that is one half of a length of a length of an input image.

9. The method according to claim 1 wherein each shallow neural network has up to four layers.

10. The method according to claim 1 wherein each shallow neural network has up to five layers.

11. A non-transitory computer readable medium for detecting an object by an object detector, wherein the non-transitory computer readable medium stores instructions for:
receiving an input image by an input of the object detector; wherein the object detector comprises multiple branches;
generating at least one downscaled version of the input image;
feeding the input image to a first branch of the multiple branches;
feeding each one of the at least one downscale version of the input image to a unique branch of the multiple branches, one downscale version of the image per branch;
calculating, by the multiple branches, candidate bounding boxes that are indicative of candidate objects that appear in the input image and each one of the at least one downscaled version of the input image;
selecting bounding boxes out of the candidate bounding boxes, by a selection unit that follows the multiple branches;
wherein the multiple branches comprise multiple shallow neural networks that are followed by multiple region units; wherein each branch comprises a shallow neural network and a region unit;
wherein the multiple shallow neural networks are multiple instances of a single trained shallow neural network; and
wherein the single trained shallow neural network is trained to detect objects having a size that is within a predefined size range and to ignore objects having a size that is outside the predefined size range.

12. The non-transitory computer readable medium according to claim 11 wherein the predefined size range ranges between (a) ten by ten pixels, till (b) one hundred by one hundred pixels.

13. The non-transitory computer readable medium according to claim 11 wherein the predefined size range ranges between (a) sixteen by sixteen pixels, till (b) one hundred and twenty pixels by one hundred and twenty pixels.

14. The non-transitory computer readable medium according to claim 11 wherein the predefined size range ranges between (a) eighty by eighty pixels, till (b) one hundred by one hundred pixels.

15. The non-transitory computer readable medium according to claim 11 wherein the multiple branches are three branches and wherein there are two downscaled versions of the input image.

16. The non-transitory computer readable medium according to claim 11 wherein the generating of the at least one downscaled version of the input image comprises generating multiple downscaled versions of the input image.

17. The non-transitory computer readable medium according to claim 16 that stores instructions for generating the multiple downscaled applying a same downscaling ratio between (a) the input image and a first downscaled version of the image and between (b) the first downscale version of the input image to a second downscale version of the input image.

18. The non-transitory computer readable medium according to claim 16 wherein a first downscale version of the input image has a width that is one half of a width of the input image and a length that is one half of a length of a length of an input image.

19. The non-transitory computer readable medium according to claim 11 wherein each shallow neural network has up to four layers.

20. The non-transitory computer readable medium according to claim 11 wherein each shallow neural network has up to five layers.

21. An object detection system that comprises an input, a downscaling unit, multiple branches, and a selection unit;
   wherein the input is configured to receive an input image;
   wherein the downscaling unit is configured to generate at least one downscaled version of the input image;
   wherein the multiple branches are configured to receive the input image and the at least one downscaled version of the input image, one image per branch;
   wherein the multiple branches are configured to calculate candidate bounding boxes that are indicative of candidate objects that appear in the input image and each one of the at least one downscaled version of the input image;
   wherein the selection unit is configured to select bounding boxes out of the candidate bounding boxes;
   wherein the multiple branches comprise multiple shallow neural networks that are followed by multiple region units; wherein each branch comprises a shallow neural network and a region unit;
   wherein the multiple shallow neural networks are multiple instances of a single trained shallow neural network; and
   wherein the single trained shallow neural network is trained to detect objects having a size that is within a predefined size range and to ignore objects having a size that is outside the predefined size range.

22. The object detection system according to claim 21 wherein the predefined size range ranges between (a) ten by ten pixels, till (b) one hundred by one hundred pixels.

23. The object detection system according to claim 21 wherein the predefined size range ranges between (a) sixteen by sixteen pixels, till (b) one hundred and twenty pixels by one hundred and twenty pixels.

24. The object detection system according to claim 21 wherein the predefined size range ranges between (a) eighty by eighty pixels, till (b) one hundred by one hundred pixels.

25. The object detection system according to claim 21 wherein the multiple branches are three branches and wherein there are two downscaled versions of the input image.

26. The object detection system according to claim 21 wherein the generating of the at least one downscaled version of the input image comprises generating multiple downscaled versions of the input image.

27. The object detection system according to claim 26 wherein the downscaling unit is configured to generate the multiple downscaled applying a same downscaling ratio between (a) the input image and a first downscaled version of the image and between (b) the first downscale version of the input image to a second downscale version of the input image.

28. The object detection system according to claim 26 wherein a first downscale version of the input image has a width that is one half of a width of the input image and a length that is one half of a length of a length of an input image.

29. The object detection system according to claim 21 wherein each shallow neural network has up to four layers.

30. The object detection system according to claim 21 wherein each shallow neural network has up to five layers.

* * * * *